United States Patent
Shimada et al.

(10) Patent No.: US 10,473,079 B2
(45) Date of Patent: Nov. 12, 2019

(54) PROTECTIVE CONSTRUCTION OF FUEL PUMP

(71) Applicant: Honda Motor Co., Ltd., Tokyo (JP)

(72) Inventors: Kazuyuki Shimada, Saitama (JP); Tetsuji Furukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 69 days.

(21) Appl. No.: 15/469,579

(22) Filed: Mar. 27, 2017

(65) Prior Publication Data

US 2017/0284352 A1 Oct. 5, 2017

(30) Foreign Application Priority Data

Mar. 29, 2016 (JP) .................. 2016-066546

(51) Int. Cl.
*F02M 59/44* (2006.01)
*F02B 75/22* (2006.01)

(52) U.S. Cl.
CPC ............ *F02M 59/44* (2013.01); *F02B 75/22* (2013.01); *F02M 2200/185* (2013.01); *F02M 2200/855* (2013.01)

(58) Field of Classification Search
CPC ............ F02M 59/44; F02M 2200/855; F02M 2200/185; F02B 75/22
See application file for complete search history.

(56) References Cited

U.S. PATENT DOCUMENTS

2015/0040873 A1* 2/2015 Kitamura ............. F02D 41/406
123/506

FOREIGN PATENT DOCUMENTS

| JP | 10196393 A | * | 7/1998 | ............ F02B 75/22 |
| JP | 2014-129762 | | 7/2014 | |
| WO | WO 2011106244 A2 | * | 9/2011 | ......... B60R 13/0838 |

OTHER PUBLICATIONS

Office Action of China Counterpart Application, with English translation thereof, dated Jul. 4, 2019, pp. 1-14.

* cited by examiner

*Primary Examiner* — Jacob M Amick
*Assistant Examiner* — Charles Brauch
(74) *Attorney, Agent, or Firm* — JCIPRNET

(57) ABSTRACT

The present invention provides a protective construction of a fuel pump. The protective construction includes a pump shield, disposed on an internal-combustion engine, wherein a specified interval exists at a carriage side of a vehicle in opposite to a high-pressure fuel pump and the pump shield overlaps the high-pressure fuel pump in a front and rear direction. The pump shield includes: a base portion having a width increasing gradually towards the high-pressure fuel pump; a left protective arm portion and a right protective arm portion, extending diagonally and integrally extend upwards from a specified location of the base portion to the side of the high-pressure fuel pump, wherein an interval between the left protective arm portion and the right protective arm portion increases gradually towards the high-pressure fuel pump, and a beam portion, integrally extending between the left protective arm portion and the right protective arm portion.

16 Claims, 11 Drawing Sheets

PROTECTIVE CONSTRUCTION OF FUEL PUMP

CROSS-REFERENCE TO RELATED APPLICATION

This application claims the priority benefit of Japan application serial no. 2016-066546, filed on Mar. 29, 2016. The entirety of the above-mentioned patent application is hereby incorporated by reference herein and made a part of this specification.

BACKGROUND OF THE INVENTION

1. Field of the Invention

The present invention relates to a protective construction of a fuel pump of an internal-combustion engine carried on a vehicle.

2. Description of Related Art

Previously, as regards an internal-combustion engine carried on a vehicle, an internal-combustion engine disclosed in patent document 1 is known. The internal-combustion engine includes an intercooler for cooling inhaled gas and a high-pressure fuel pump for boosting a fuel and supplying the fuel to a side of a fuel injection valve. The high-pressure fuel pump is configured above a cylinder head.

In the internal-combustion engine, when a vehicle and an obstacle at the front of the vehicle collide, damaged vehicle parts possibly reach a high-pressure fuel pump and cause the high-pressure fuel pump to be damaged. Therefore, to avoid this situation, an intercooler is configured in a manner of covering a front portion of a high-pressure fuel pump. That is, an intercooler further has, in addition to a function of cooling inhaled gas, a function of being used as a protective construction of a high-pressure fuel pump. Moreover, in the following descriptions, a situation in which a vehicle and an obstacle at the front of the vehicle collide is referred to as "front collision".

PRIOR ART DOCUMENT

Patent Document

[Patent document 1] JP Patent Publication No. 2014-129762

SUMMARY OF THE INVENTION

Problems to be Resolved by the Present Invention

In recent years, when an internal-combustion engine is carried on a front vehicle as a power source, the internal-combustion engine is generally a construction of absorbing shock by intentionally flattening a front portion of the vehicle when front collision occurs. As stated above, when the front portion is flattened, the internal-combustion engine is pushed to a carriage side and moves. Compared to this, when the internal-combustion engine is the protective construction of the existing patent document 1, although a front portion of a high-pressure fuel pump is protected by an intercooler, a rear portion of the high-pressure fuel pump is not protected by any component. Therefore, when the internal-combustion engine is pushed to the carriage side due to front collusion of the vehicle and moves, the high-pressure fuel pump possibly collides with a wall of an engine compartment and is damaged.

The present invention is completed to resolve the problem and is directed to providing a protection construction of a fuel pump which can appropriately protect the fuel pump and improve marketability even if the internal-combustion engine is pushed to the carriage side due to collision of the vehicle and moves.

Technical Means for Resolving the Problems

To achieve the objective, an invention of a first invention is a protective construction of a fuel pump (a high-pressure fuel pump 2), disposed on an internal-combustion engine 3 in a manner of protruding upwards from the internal-combustion engine 3 carried on a vehicle 4. The protective construction of the fuel pump (the high-pressure fuel pump 2) includes: a protective portion (a pump shield 1), protruding upwards from the internal-combustion engine 3, provided with a specified interval at a carriage 6 side of the vehicle 4 with respect to the fuel pump (the high-pressure fuel pump 2), and disposed on the internal-combustion engine 3 in a manner of overlapping the fuel pump (the high-pressure fuel pump 2) in a front and rear direction.

According to the protective construction of the fuel pump, the fuel pump is disposed on the internal-combustion engine in a manner of protruding upwards from an internal-combustion engine, and the protective portion protrudes upwards from the internal-combustion engine, is provided with a specified interval at a carriage side of a vehicle in opposite to the fuel pump, and is disposed on the internal-combustion engine in a manner of overlapping the fuel pump in a front and rear direction. Therefore, even if the internal-combustion engine is pushed to the carriage side due to collision of the vehicle and moves, a part, at the carriage side, of the fuel pump is prevented, by using the protective portion, from directly colliding with a wall of an engine compartment, so as to appropriately protecting the fuel pump. A result thereof is that the internal-combustion engine can be made to be configured near a carriage side of the engine compartment, thereby improving a design freedom degree and improving marketability.

In an invention of a second invention, in the protective construction of the fuel pump (the high-pressure fuel pump 2) according to the first invention, the internal-combustion engine 3 is a multi-cylinder internal-combustion engine 3 transversely carried on the vehicle 4, and the fuel pump (the high-pressure fuel pump 2) and the protective portion (the pump shield 1) are configured near a central position between two adjacent cylinders in a state of lining up in a front and rear direction.

According to the protective construction of the fuel pump, the internal-combustion engine is a multi-cylinder internal-combustion engine transversely carried on the vehicle, and the fuel pump and the protective portion are configured near a central position between two adjacent cylinders in a state of lining up in a front and rear direction. Therefore, when a spark plug or an in-cylinder fuel injection valve is disposed on a cylinder head, restrictions thereof in configurations can be reduced, to improve a design freedom degree. Hence, marketability can be further improved.

In an invention of a third invention, in the protective construction of the fuel pump (the high-pressure fuel pump 2) according to the first invention or the second invention, the internal-combustion engine 3 is a V-type internal-combustion engine 3 that includes two banks (a front bank 3a and a rear bank 3b) and that is transversely carried on the vehicle 4, the fuel pump (the high-pressure fuel pump 2) is configured, with respect to a bank (the rear bank 3b) at the carriage 6 side of the two banks (the front bank 3a and the rear bank 3b), in a state of offsetting by a specified distance L from a center of the bank (the rear bank 3b) to a side of the other bank (the front bank 3a), and the protective portion (the pump shield 1) is configured in a space produced due to an offset by the specified distance L of the fuel pump (the high-pressure fuel pump 2).

According to the protective construction of the fuel pump, the fuel pump is configured, with respect to a bank at the carriage side of the two banks of a transverse V-type internal-combustion engine, in a state of offsetting by a specified distance from a center of the bank to a side of the other bank, and the protective portion is configured in a space produced due to an offset by the specified distance of the fuel pump. Therefore, configurations of other parts on an upper surface of a bank do not need to be changed in order to set the protective portion. Hence, a design freedom degree can be further improved.

In a fourth invention of a fourth invention, in the protective construction of the fuel pump (the high-pressure fuel pump 2) according to any one of the first invention to the third invention, the protective portion (the pump shield 1) includes: a base portion 10, having a width increasing gradually towards the fuel pump (the high-pressure fuel pump 2); two pump protective portions (a left protective arm portion 11 and a right protective arm portion 12), extending diagonally and upwards from a specified location of the base portion 10 to the side of the fuel pump (the high-pressure fuel pump 2), having an interval between the left protective arm portion and the right protective arm portion, wherein the interval increases gradually towards the high-pressure fuel pump, and a support portion (a beam portion 13), integrally extending between the two pump protective portions (the left protective arm portion 11 and the right protective arm portion 12).

According to the protective construction of the fuel pump, the protective portion includes: a base portion, having a width increasing gradually towards the high-pressure fuel pump; two pump protective portions, extending diagonally and upwards from a specified location of the base portion to the side of the fuel pump, and having an interval between the left protective arm portion and the right protective arm portion, wherein the interval increases gradually towards the high-pressure fuel pump, and a support portion, integrally extending between the two pump protective portions. Therefore, when the internal-combustion engine is pushed to the carriage side due to collision of the vehicle and moves, the protective portion is the following state, that is, the protective portion is pressed against the wall of the engine compartment by using the two pump protective portions and accepts a counterforce from the pressed location.

In this case, the base portion has a width increasing gradually towards the high-pressure fuel pump, the two pump protective portions extend diagonally and integrally extend upwards from a specified location of the base portion to the side of the fuel pump, and the support portion integrally extends between the two pump protective portions. Therefore, the counterforce from the pressed location can be firmly prevented by using the base portion, the two pump protective portions, and the support portion. In addition, the two pump protective portions have an interval between the left protective arm portion and the right protective arm portion, wherein the interval increases gradually towards the high-pressure fuel pump. Therefore, the location pressed by the two pump protective portions can be made to be deformed to be concave in a shape of a sector or an inverted triangle facing an opposite side of the protective portion. By means of the above compositions, when the protective portion is pressed against the wall of the engine compartment, by using the two pump protective portions, the wall of the engine compartment can be made to be deformed to be concave in a shape of a sector or an inverted triangle facing an opposite side of the protective portion, and the fuel pump can be appropriately protected. A result thereof can further improve marketability.

In an invention of a fifth invention, in the protective construction of the fuel pump according to any one of the first invention to the fourth invention, the protective portion (the pump shield 1) is a protective component (the pump shield 1) that is independent of a main body (a cylinder head) of the internal-combustion engine 3 and that is screw-fastened on the main body, multiple screw holes (a mounting hole 10d to a mounting hole 100 used to screw-fasten the protective component (the pump shield 1) on the main body of the internal-combustion engine 3 are disposed on the base portion 10 of the protective component (the pump shield 1), and at least one (the mounting hole 100 of the multiple screw holes and support portion (the beam portion 13) are configured to line up in a left and right direction of the vehicle 4.

According to the protective construction of the fuel pump, multiple screw holes used to screw-fasten the protective component on the main body of the internal-combustion engine are disposed on the base portion of the protective component, and at least one of the multiple screw holes and the support portion are configured to line up in the left and right direction of the vehicle. Therefore, when a counterforce in collision obliquely acts on the pump protective portions with respect to an axial direction of the pump protective portions, a component force of the counterforce can be supported by means of mutual cooperation between the support portion and a bolt. A result thereof is that the wall of the engine compartment is made to be more certainly deformed, so as to further improve marketability (moreover, in this specification, the cylinder head, a cylinder block, and a crankcase are included to be referred to as "a main body of an internal-combustion engine").

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
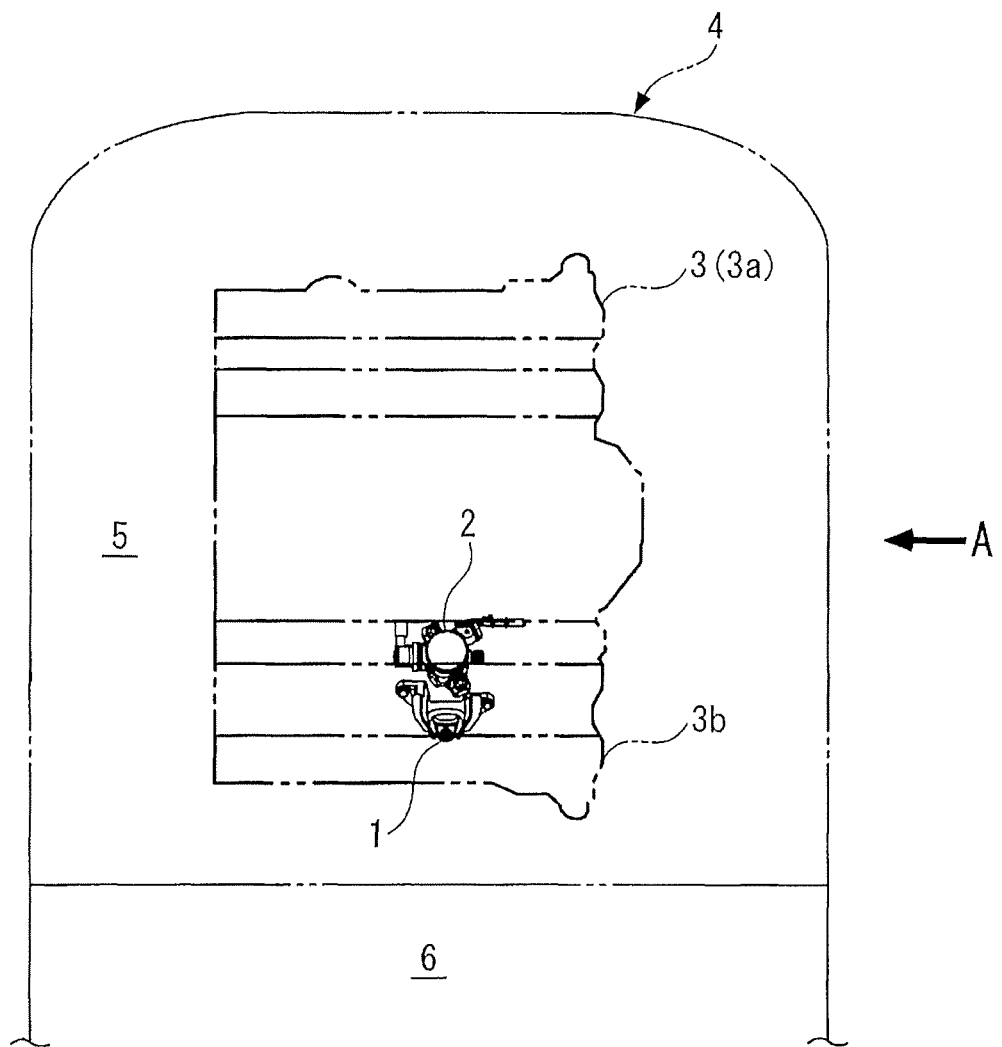
FIG. 1 is a diagram of compositions of an internal-combustion engine and a vehicle to which a protective construction of a fuel pump in an implementation manner of the present invention is applied and that are observed from the top.

Reference will now be made in detail to the present preferred embodiments of the invention, examples of which are illustrated in the accompanying drawings. Wherever possible, the same reference numbers are used in the drawings and the description to refer to the same or like parts.

A protective construction of a fuel pump in an implementation manner of the present invention is described below with reference to the accompanying drawings. As shown in FIG. 1, a high-pressure fuel pump 2 and a pump shield 1 protecting the high-pressure fuel pump 2 in this implementation manner are components applied to an internal-combustion engine 3 (referred to as "engine" thereafter). The engine 3 is carried on a vehicle 4 as a power source. Moreover, in the following descriptions, a left side and a right side of FIG. 1 are referred to as "right" and "left", and an upper side and a lower side of FIG. 1 are referred to as "front" and "rear".

Figure 2:
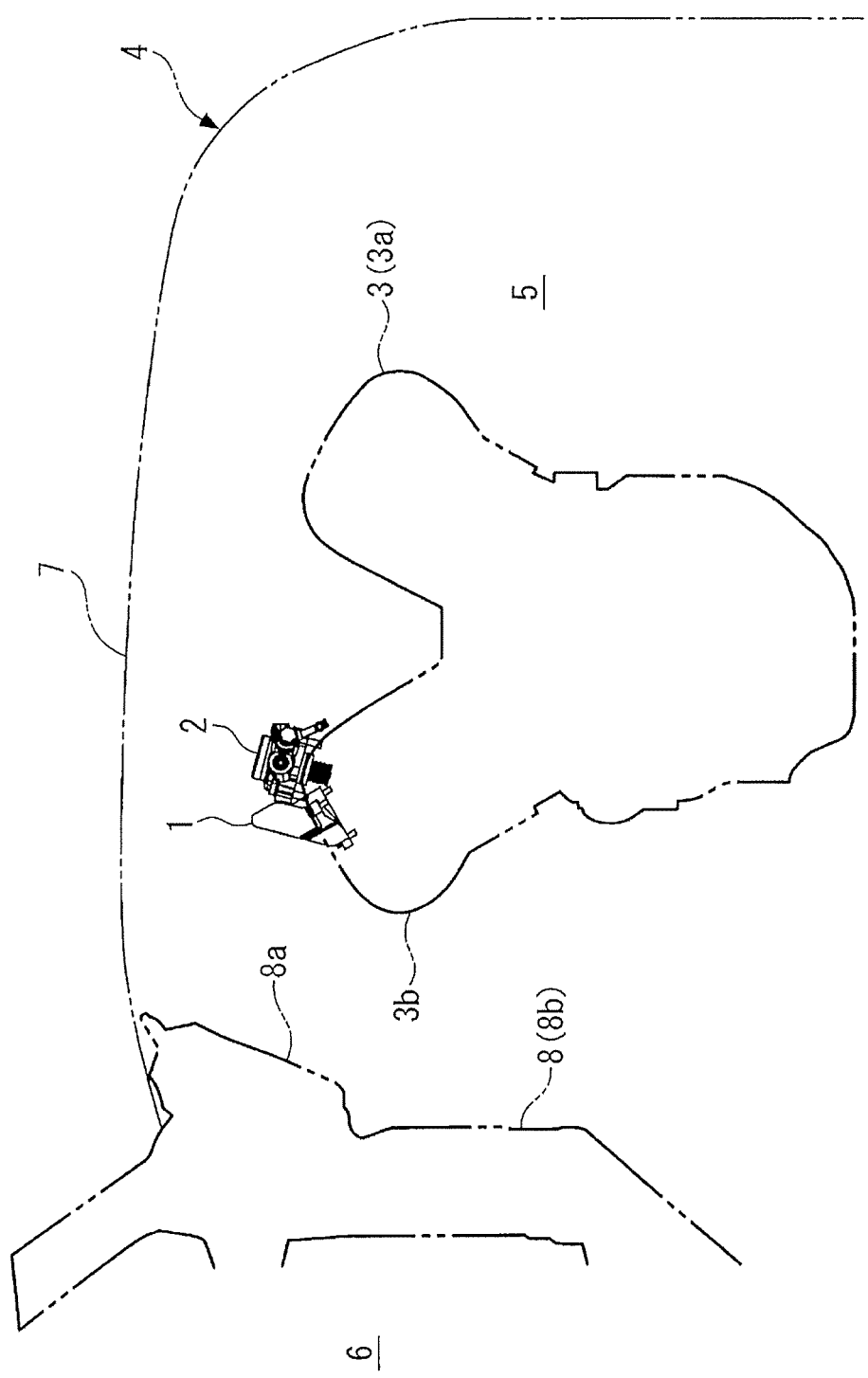
FIG. 2 is a view of a direction A in FIG. 1.

The vehicle 4 includes an engine compartment 5 configured at the front of the vehicle 4 and a carriage 6 configured at a position more rear than the engine compartment 5. As shown in FIG. 2, the engine compartment 5 is formed by an engine hood (engine hood) 7 and a partition wall 8, and the engine 3 is accommodated in the engine compartment 5. In the vehicle 4, a front wheel not shown in the figure is driven by power of the engine 3. That is, the vehicle 4 constitutes a front engine (front engine) and a front drive (front drive) vehicle.

In addition, the partition wall 8 is configured between the engine compartment 5 and the carriage 6 in order to separate the engine compartment 5 and the carriage 6 and includes an upper partition wall 8a and a lower partition wall 8b. The lower partition wall 8b is made of steel and is constituted by a part of a vehicle body. In addition, the upper partition wall 8a is a component that is made of metal and of which a surface at a carriage 6 side is a flat thin plate and is disposed in a manner of extending diagonally forwards from an upper end of the lower partition wall 8b.

On the other hand, the engine 3 is a transverse V-type engine and includes a front bank 3a in the front and a rear bank 3b in the rear. The front bank 3a and the rear bank 3b are configured at a specified bank angle (for example, 90 degrees), and three cylinders (not shown in the figure) are disposed on either of the bank 3a and the bank 3b. That is, the engine 3 constitutes a V-type six-cylinder engine.

In addition, the engine 3 is a direct-injection-type engine. On a cylinder head of each bank, an in-cylinder fuel injection valve (not shown in the figure) is disposed for each cylinder. These in-cylinder fuel injection valves are connected to a delivery pipe not shown in the figure. A high-pressure fuel pump 2 used as a fuel pump is connected on the delivery pipe.

Figure 6:
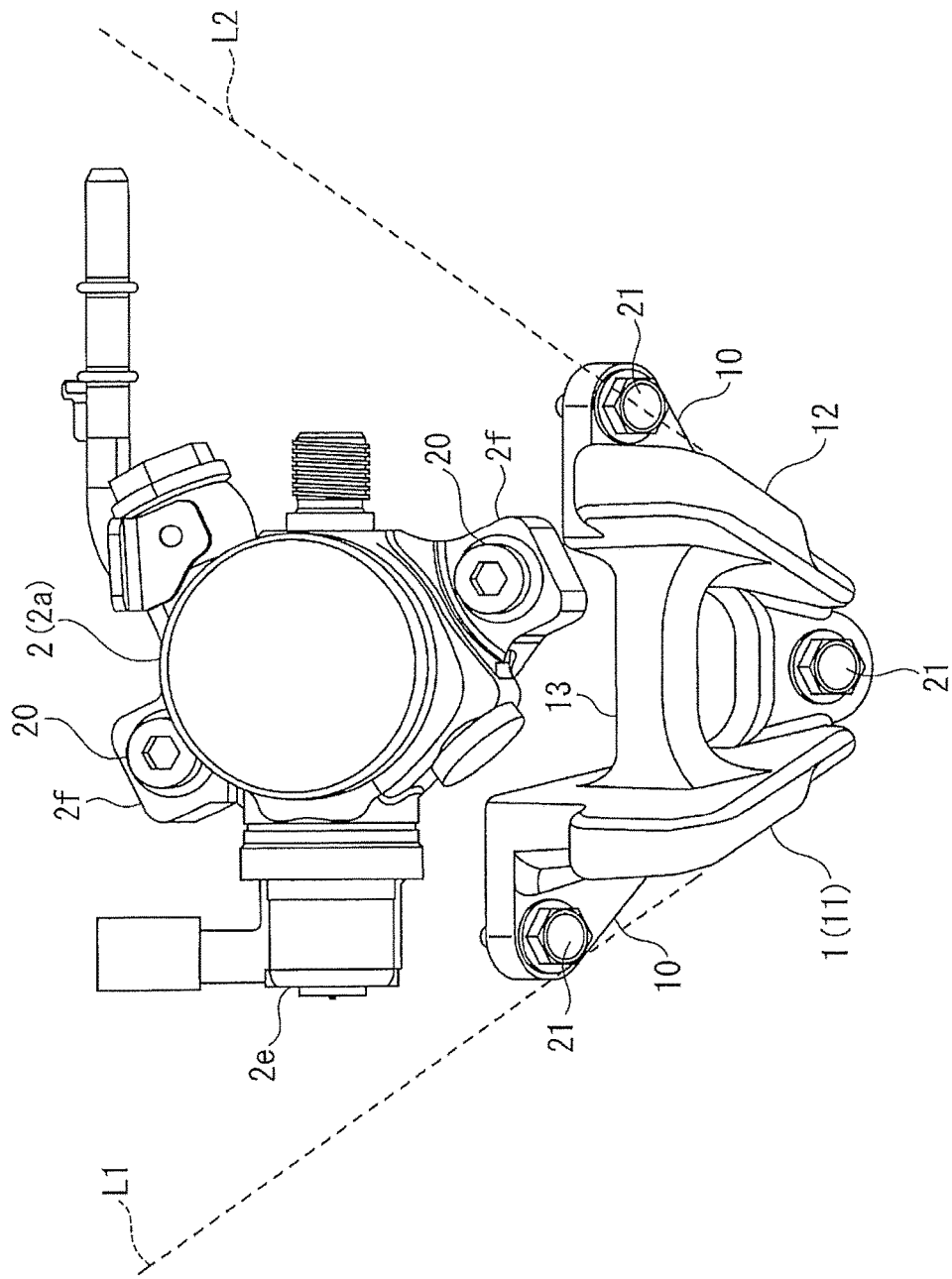
FIG. 6 is an enlarged view of a pump shield and a high-pressure fuel pump shown in FIG. 4.
Figure 7:
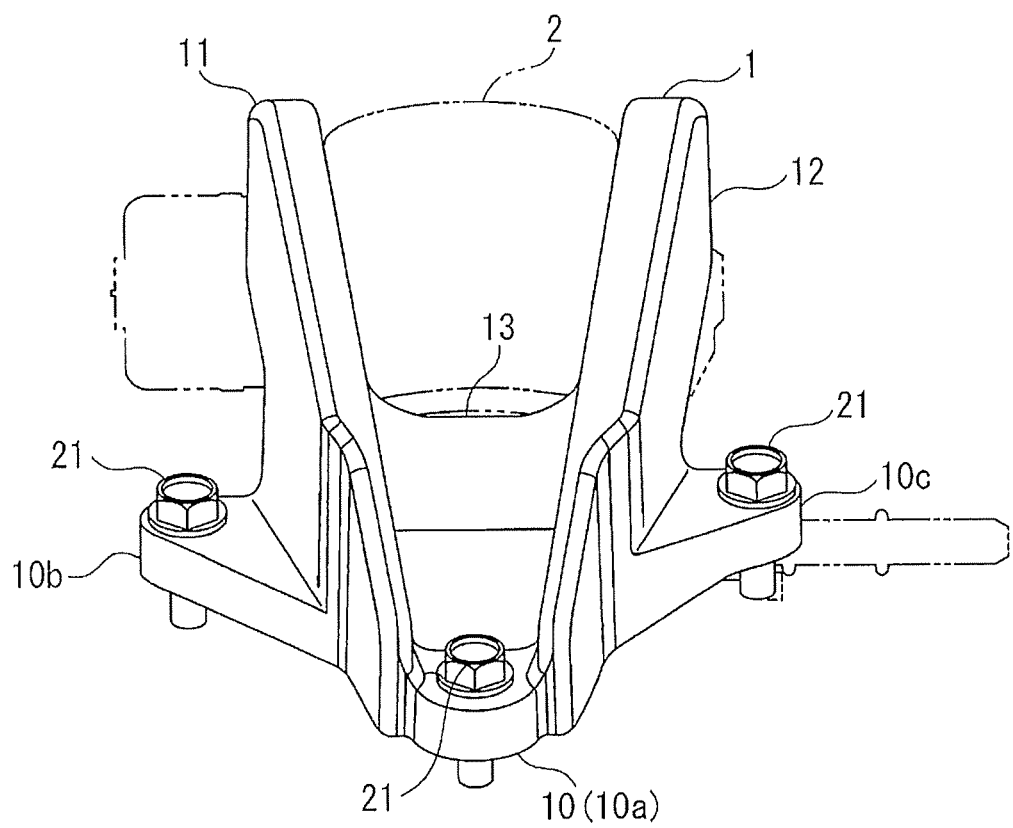
FIG. 7 is an enlarged view of a pump shield and a high-pressure fuel pump shown in FIG. 5.
Figure 8:
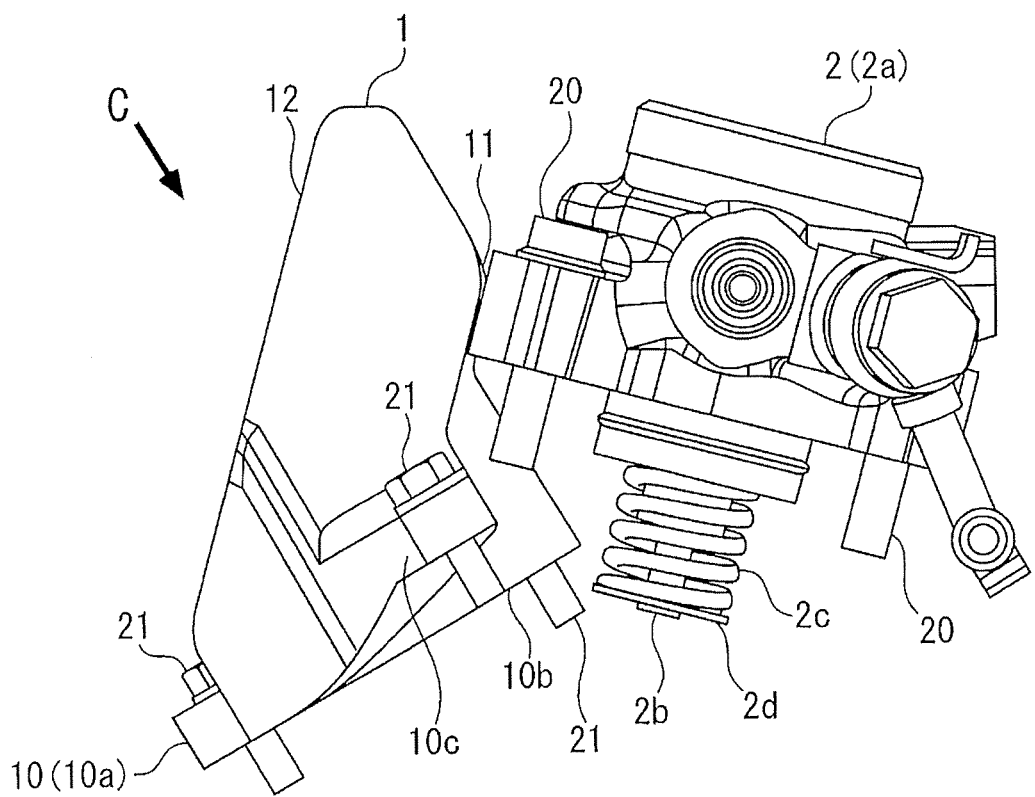
FIG. 8 is an enlarged view of a pump shield and a high-pressure fuel pump shown in FIG. 3.

As shown in FIG. 6 and FIG. 8, the high-pressure fuel pump 2 includes a casing 2a, a plunger 2b, a spiral spring 2c, a spring seat 2d, a flow control valve 2e, and two mounting ribs 2f. In the case of being the high-pressure fuel pump 2, the spring seat 2d at a front end portion of the plunger 2b is configured as a cam frequently pressed against a cam shaft (not shown in the figure) of the engine 3. By means of the cam, in a running process of the engine 3, the plunger 2b is made to be driven along an axial direction while resisting a force applied by the spiral spring 2c. Hence, in the high-pressure fuel pump 2, a fuel in the casing (casing) 2a is ejected to a side of the delivery pipe in a boosted state.

In addition, the flow control valve 2e is electrically connected to a control apparatus not shown in the figure, and an open degree of the flow control valve 2e is controlled by using the control apparatus. Hence, an amount of fuel ejected to the side of the delivery pipe in the high-pressure fuel pump 2 is controlled.

Figure 3:
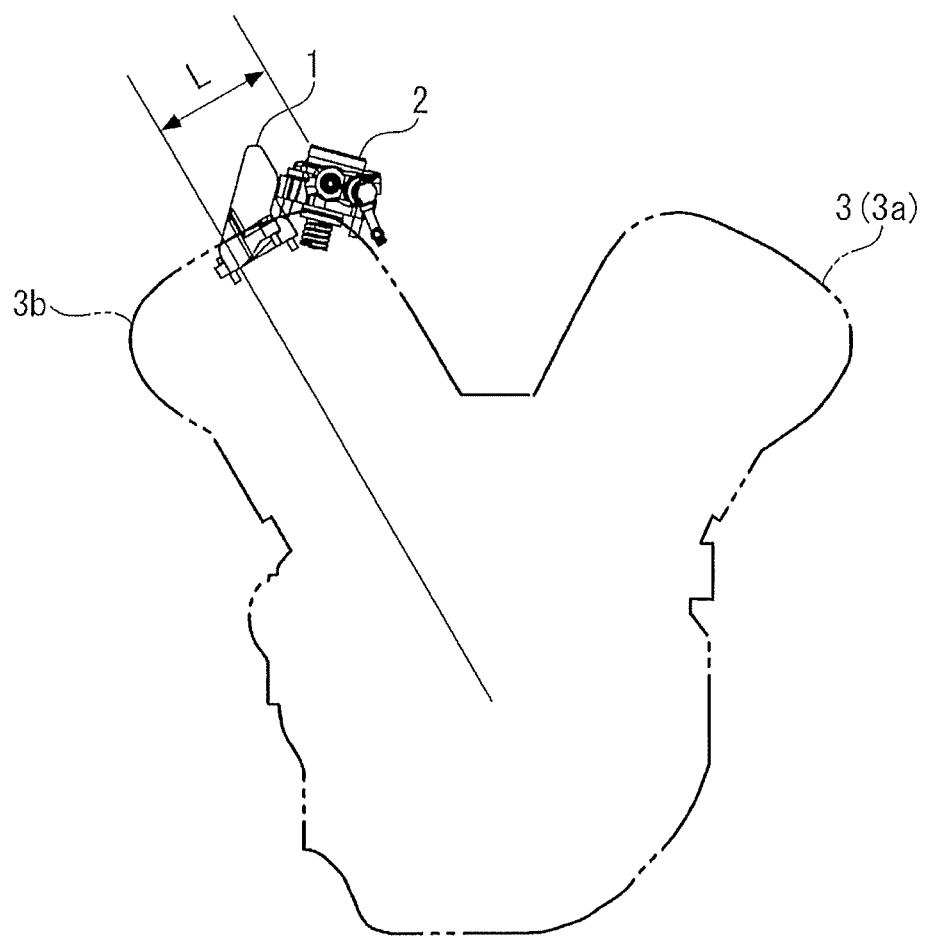
FIG. 3 is an enlarged view of an internal-combustion engine shown in FIG. 2.

In addition, mounting holes (not shown in the figure) are formed on the mounting ribs 2f of the high-pressure fuel pump 2. In a case in which two bolts 20 are respectively inserted into the mounting holes of the mounting ribs 2f, the bolts 20 are screwed into a screw hole (not shown in the figure) of a cylinder head of the rear bank 3b. Hence, the high-pressure fuel pump 2 is fastened on the cylinder head of the rear bank 3b. By means of the above compositions, as shown in FIG. 3, the high-pressure fuel pump 2 protrudes upwards from an upper end of the rear bank 3b and is mounted above the rear bank 3b in a position relationship of offsetting diagonally forwards by a specified length L with respect to a central line of the rear bank 3b.

Figure 4:
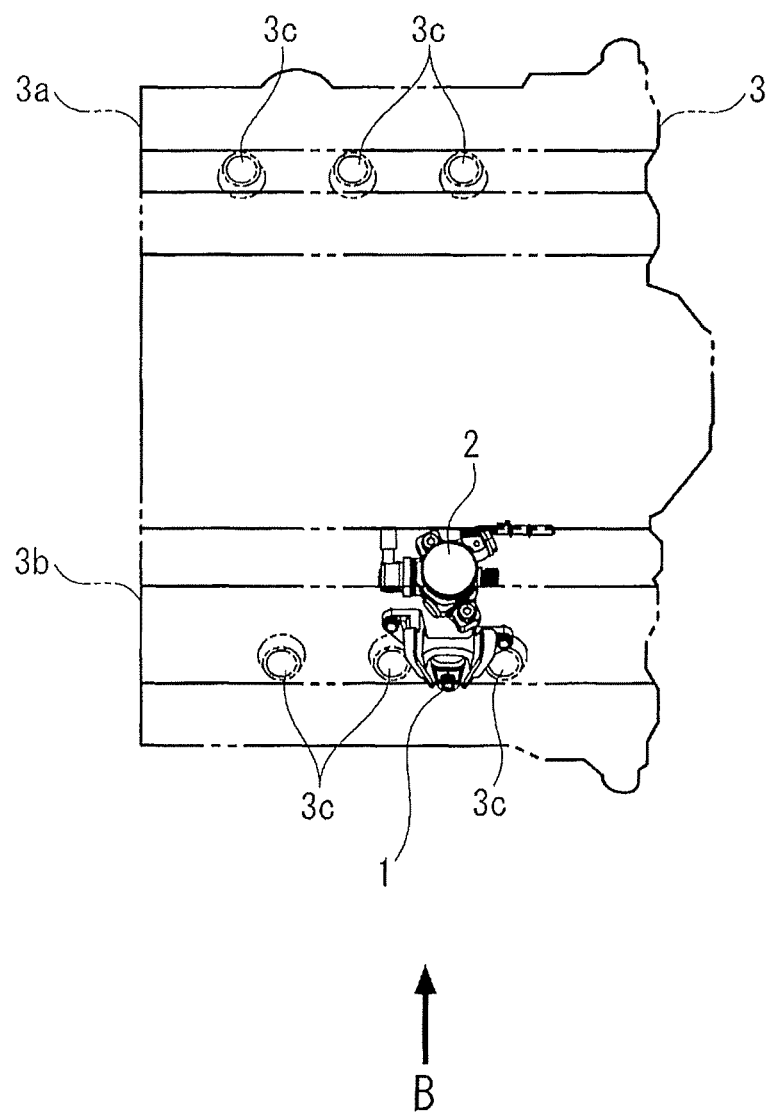
FIG. 4 is an enlarged view of an internal-combustion engine shown in FIG. 1.
Figure 5:
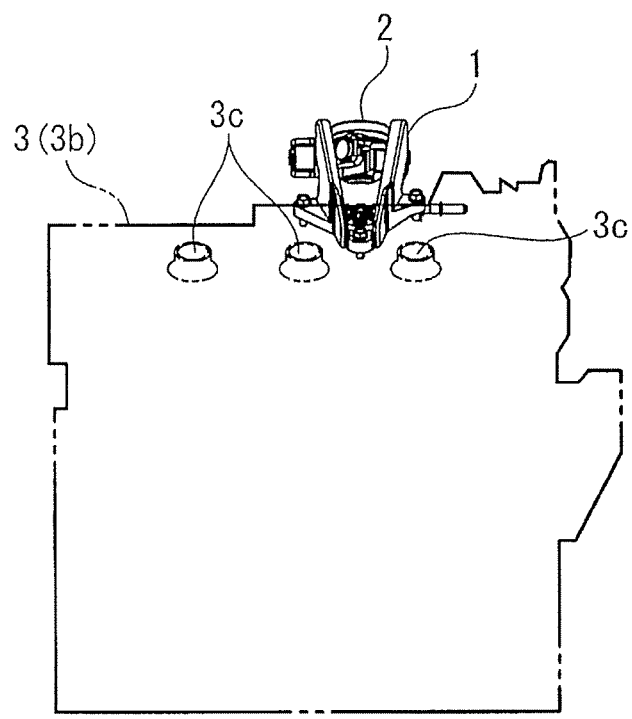
FIG. 5 is a view of a direction B in FIG. 4.

In addition, as shown in FIG. 4 and FIG. 5, on cylinder heads of the banks, three mounting holes 3c for use in the spark plug are disposed at equal intervals, and the spark plugs not shown in the figure are mounted on the banks via the mounting holes 3c. In this case, the mounting holes 3c and the spark plugs are concentrically configured with corresponding cylinders.

In addition, the pump shield 1 (the protective portion and the protective component) is a component made of metal (for example, be made of stainless steel or an aluminum alloy), and as shown in FIG. 4 and FIG. 6, is disposed in the rear of the high-pressure fuel pump 2 and in a state of being provided with a specified interval. That is, the pump shield 1 is configured in a space produced due to an offset of the high-pressure fuel pump 2.

In addition, the high-pressure fuel pump 2 and the pump shield 1 are configured in a manner that central positions of a front and rear direction of the high-pressure fuel pump 2 and the pump shield 1 are located near the center of the two mounting holes 3c and. That is, the high-pressure fuel pump 2 and the pump shield 1 are disposed in a manner of being located near the center between two adjacent cylinders.

Figure 9:
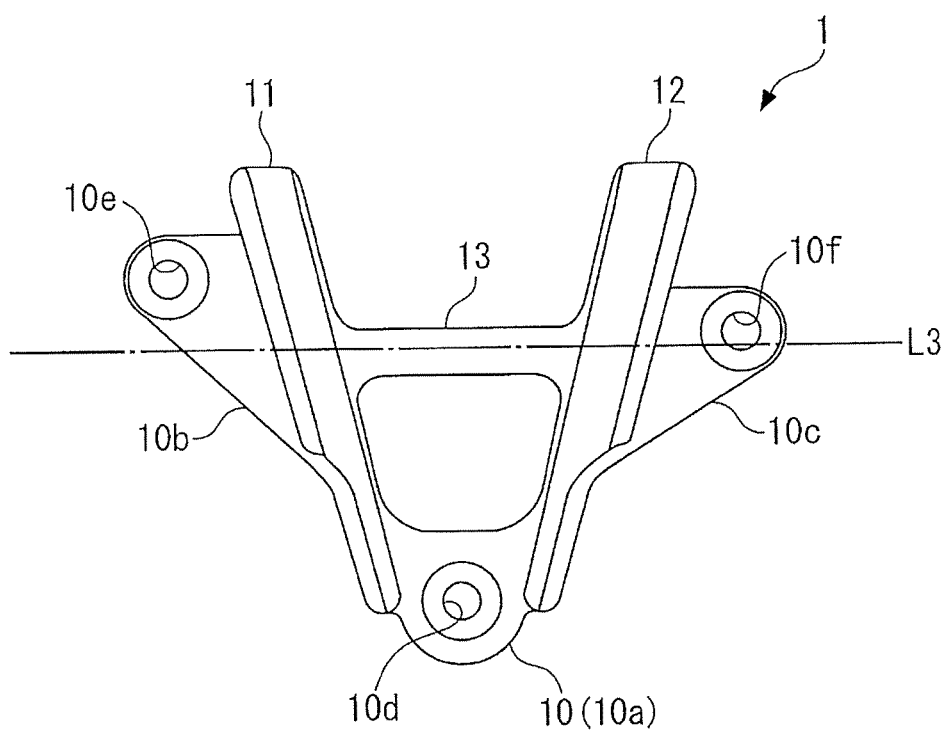
FIG. 9 is a view of a direction C in FIG. 8.

As shown in FIG. 6 to FIG. 9, the pump shield 1 includes a base portion 10, a left protective arm portion 11, a right protective arm portion 12, and a beam portion 13. The constituent element 10 to the constituent element 13 are formed in an integrated manner. As shown in FIG. 9, the base portion 10 form a V shape when being viewed from the top and integrally includes a rear rib 10a, a left-front rib 10b, and a right-front rib 10c.

A mounting hole 10d to a mounting hole 10f (screw holes) are disposed on the rib 10a to the rib 10c. Three bolts 21 are respectively inserted into three mounting holes, that is, the mounting hole 10d to the mounting hole 10f and are screwed into the screw hole (not shown in the figure) of the cylinder head of the rear bank 3b. Hence, the base portion 10, that is, the pump shield 1, is fastened to the cylinder head of the rear bank 3b.

In addition, as shown in FIG. 8, the bottom of the right-front rib 10c extends diagonally upwards from the bottom of the rear rib 10a, and the bottom of the left-front rib 10b is aligned with the bottom of the rear rib 10a. A result thereof is that a position relationship that the bottom of the location at which the mounting hole 10f of the right-front rib 10c is located is higher than the bottom of the location at which the mounting hole 10d of the left-front rib 10b is located is formed. The situation is caused by a shape of a mounting position of an upper surface of the cylinder head.

In addition, the left protective arm portion 11 (the pump protective portion) extends, from the base portion 10, diagonally leftwards with respect to the front and rear direction and diagonally upwards in a board shape with respect to a horizontal direction. An upper side portion thereof is thicker than a lower side portion. When a straight line is drawn along a left edge of an upper end surface of the upper side portion, the straight line is as shown in a dotted line L1 of FIG. 6 when being viewed from the top.

In addition, the right protective arm portion 12 (the pump protective portion) extends, from the base portion 10, diagonally rightwards with respect to the front and rear direction and diagonally upwards in a board shape with respect to a horizontal direction. An upper side portion thereof is thicker than a lower side portion. When a straight line is drawn along a right edge of an upper end surface of the upper side portion, the straight line is as shown in a dotted line L2 of FIG. 6 when being viewed from the top. That is, the left protective arm portion 11 and the right protective arm portion 12 have an interval between the left protective arm portion and the right protective arm portion, wherein the interval increases gradually towards the high-pressure fuel pump.

In addition, in the case of being the pump shield 1, during viewing from the top, an angle of the left protective arm portion 11 with respect to the front and rear direction and angle of the right protective arm portion 12 with respect to the front and rear direction are set to be the same (referring to FIG. 6). During viewing from a back surface side, an angle of the left protective arm portion 11 with respect to a vertical direction and an angle of the right protective arm portion 12 with respect to a vertical direction are set to be the same (referring to FIG. 7). In addition, an upper end surface of the left protective arm portion 11 and an upper end surface of the right protective arm portion 12 are configured to be located on a same plane (referring to FIG. 8).

In addition, the beam portion 13 (the support portion) integrally extends in the left and right direction between a location slightly closer to an upper side than a central portion of the left protective arm portion 11 and a location slightly closer to an upper side than a central portion of the right protective arm portion 12 and is constituted in a manner that a central line L3 of the beam portion 13 (the support portion) is located at a position slightly deviating downwards with respect to a central position of the mounting hole 10f (referring to FIG. 9).

Figure 10:
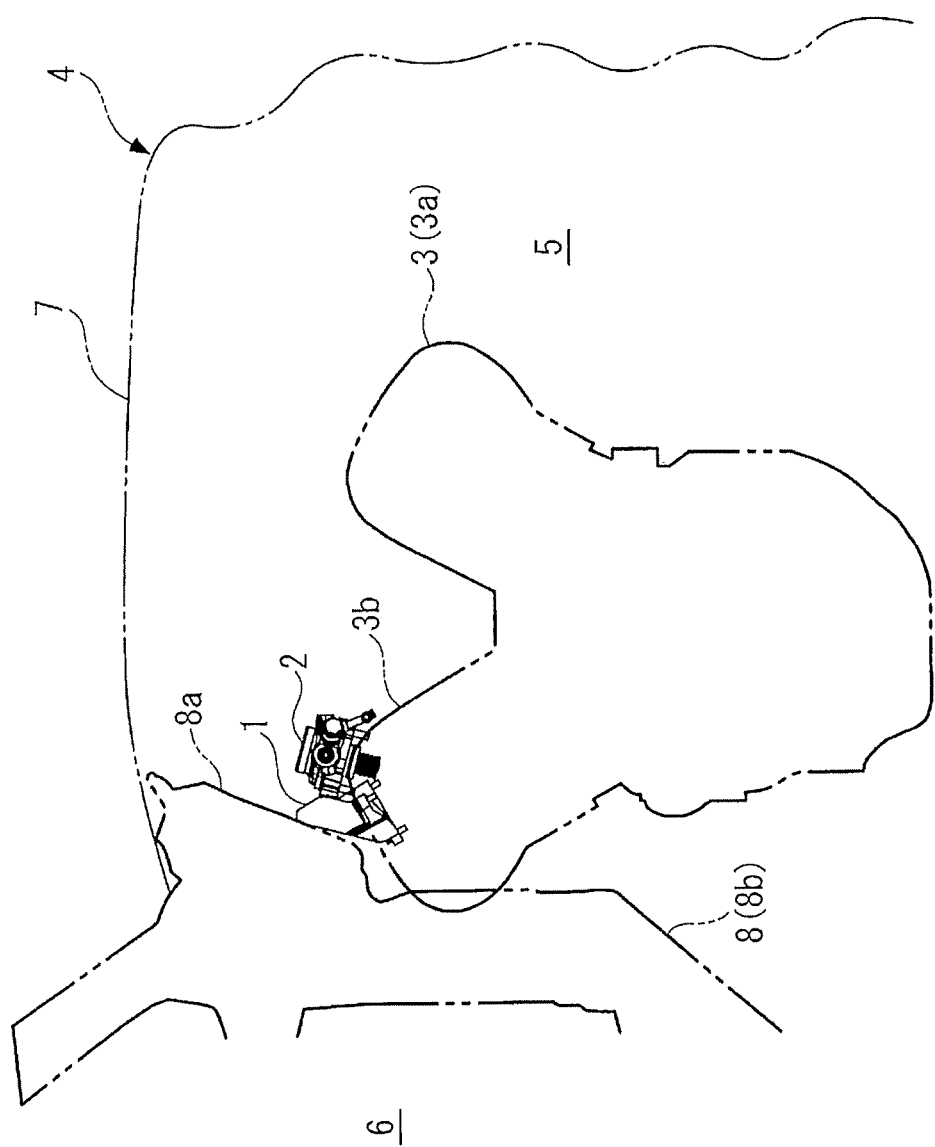
FIG. 10 is a diagram of a state indicating that a pump shield is pressed again an upper partition wall.

Secondly, reasons why the pump shield 1 is constituted in the manner as described above are described. That is, when engine 3 moves to the carriage 6 side because of front collision of the vehicle 4, as shown in FIG. 10, the pump shield 1 is pressed against upper end surfaces of the left protective arm portion 11 and the right protective arm portion 12 in a state of being on or near a surface point of the upper partition wall 8a. In this case, for example, when the upper end surfaces of the left protective arm portion 11 and the right protective arm portion 12 are pressed against a surface of the upper partition wall 8a in a same time sequence. Because the pressed surfaces, that is, the upper end surfaces, of the left protective arm portion 11 and the right protective arm portion 12 have a shape with a specified length along a pressed direction from the base portion 10, and the beam portion 13 integrally extends between the left protective arm portion 11 and the right protective arm portion 12, the left protective arm portion 11 and the right protective arm portion 12 have high strength (rigidity) along the pressed direction.

Meanwhile, the upper partition wall 8a is a component that is made of metal and of which a surface is a flat thin plate, and therefore is pushed by the left protective arm portion 11 and the right protective arm portion 12 having high strength as described above. When being viewed from the top, the upper partition wall 8a is deformed in a manner of being concave to the carriage 6 side in a sector shape (or an inverted triangle shape) specified in the dotted line L1 or the dotted line L2 of FIG. 6.

A result thereof is that the high-pressure fuel pump 2 is configured in an area deformed in a sector shape of the upper partition wall 8a, that is, is configured in an area protected by the pump shield 1, thereby avoiding direct contact between the high-pressure fuel pump 2 and the upper partition wall 8a as much as possible, so that the high-pressure fuel pump 2 is appropriately protected by the pump shield 1.

In addition, in the case of being the vehicle 4 of this implementation manner, the following construction is formed: when the pump shield 1 is pressed against the upper partition wall 8a, a state in which the right protective arm portion 12, prior to the left protective arm portion 11, is pressed against the upper partition wall 8a is easily generated because of the shape of configurations of the engine 3, that is, an unilateral contact state of the right protective arm portion 12 is easily generated.

Figure 11:
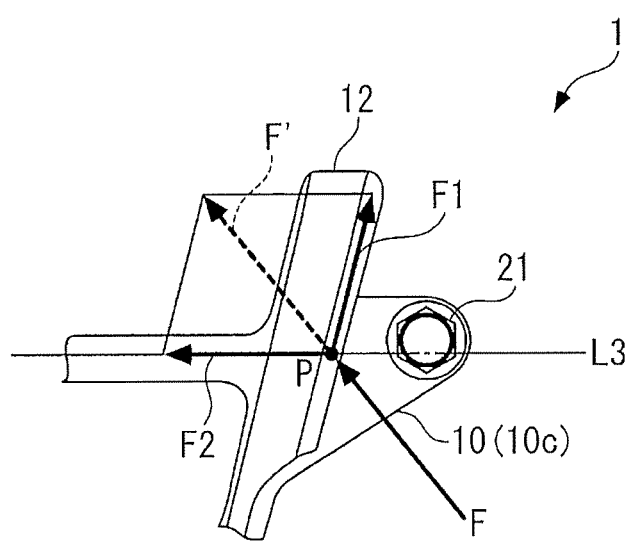
FIG. 11 is a diagram for describing a force acting on a right protective arm portion of a pump shield.

When the unilateral contact state of the right protective arm portion 12 described above is generated, a counterforce from the upper partition wall 8a actually acts on the right protective arm portion 12 as a distributed load. Herein, for description, as shown in FIG. 11, it is assumed that a load F as a concentrated load only acts on an action point P. In this case, the load F is divided into a component force F1 acting on the right protective arm portion 12 and a component force F2 acting on the beam portion 13. The component force F2 acts on the bolt 21 while acting on the beam portion 13 as a compressive load. That is, although the central line L3 of the beam portion 13 slightly deviates from the central position of the mounting hole 10f, because the beam portion 13 and the bolt 21 are configured to line up in the left and right direction, the beam portion 13 and the bolt 21 can mutually cooperatively support the component force F2. A result thereof is that even if the unilateral contact state of the right protective arm portion 12 is generated, strength enabling the upper partition wall 8a to be deformed can also be fully ensured.

As stated above, according to the protective construction of this implementation manner, the pump shield 1 has a specified distance and is configured at the rear of the high-pressure fuel pump 2. Therefore, even if the engine 3 is pushed to the carriage 6 side because of collision of the vehicle 4 and moves, the high-pressure fuel pump 2 can be prevented, by using the pump shield 1, from directly colliding with the upper partition wall 8a, so as to appropriately protect the high-pressure fuel pump 2. A result is that the engine 3 can be made to be configured near a carriage 6 side of the engine compartment, thereby improving a design freedom degree and improving marketability.

In addition, the high-pressure fuel pump 2 and the pump shield 1 are configured near a central position between two adjacent cylinders in a state of lining up in the front and rear direction. Therefore, when a spark plug or an in-cylinder fuel injection valve is disposed on the cylinder head, restrictions thereof in configurations can be reduced, to improve a design freedom degree. Hence, marketability can be further improved.

Besides, the high-pressure fuel pump 2 is configured in a state of offsetting diagonally forwards by a specified distance L facing the side of the front bank 3a from the center of the rear bank 3b. The pump shield 1 is configured in a space produced due to an offset by the specified distance of the high-pressure fuel pump 2. Therefore, configurations of other parts on an upper surface of the rear bank 3b do not need to be changed in order to set the pump shield 1. Hence, a design freedom degree can be further improved.

Secondly, the front engine and the front drive vehicle are used as an example of the vehicle in the implementation manners. However, the vehicle of the present invention is not limited thereto, and a middle engine and a rear drive vehicle, or a rear engine and a rear drive vehicle can also be used.

In addition, the high-pressure fuel pump 2 is used as an example of the fuel pump in the implementation manners. However, the fuel pump of the present invention is not limited thereto. It is feasible as long as the fuel pump is a pump for fuel in the internal-combustion engine. For example, a fuel pump of which an ejection pressure is lower than that of the high-pressure fuel pump 2 may also be used.

In addition, an example of applying the protective construction of the present invention to a transverse V-type six-cylinder internal-combustion engine is used in the implementation manners. However, the protective construction of the present invention is not limited thereto, and various internal-combustion engines may also be applied. For example, the protective construction of the present invention may also be applied to a longitudinal in-line multi-cylinder internal-combustion engine, a transverse in-line multi-cylinder internal-combustion engine, a transverse V-type multi-cylinder internal-combustion engine except a six-cylinder one, and a transversely opposite multi-cylinder internal-combustion engine.

On the other hand, an example of using the pump shield 1 as the protective portion and the protective component is used in the implementation manners. However, the protective portion and the protective component of the present invention are not limited thereto. It is feasible as long as the protective portion and the protective component protrude upwards from the internal-combustion engine, are provided with a specified interval at the carriage side of the vehicle in opposite to the fuel pump, and are disposed on the internal-combustion engine in a manner of overlapping the fuel pump in the front and rear direction.

In addition, an example of screw-fastening the pump shield 1 used as the protective portion and the protective component on the cylinder head of the internal-combustion engine 3 is used in the implementation manners. However, the protective portion and the protective component of the present invention are not limited thereto. It is feasible as long as the protective portion and the protective component are disposed on the internal-combustion engine in a manner of protruding upwards. For example, the protective portion may be integrally formed on the cylinder head of the internal-combustion engine, and the protective portion or the protective component may be fastened on the cylinder head of the internal-combustion engine by welding.

In addition, an example of screw-fastening the pump shield 1 on the cylinder head used as the main body of the internal-combustion engine 3 is used in the implementation manners. However, the pump shield 1 may also be screw-fastened on a cylinder block used as the main body of the internal-combustion engine 3, or the pump shield 1 may be screw-fastened on both the cylinder head and the cylinder block.

On the other hand, an example of using the left protective arm portion 11 and the right protective arm portion 12 as two pump protective portions is used in the implementation manners. However, two pump protective portions of the present invention are not limited thereto. It is feasible as long as two pump protective portions extend diagonally and upwards from a specified location of the base portion to the side of the fuel pump, and have an interval between the left protective arm portion and the right protective arm portion, wherein the interval increases gradually towards the high-pressure fuel pump. For example, two columnar components or two wall-shaped components may also be used as two pump protective portions.

Besides, an example of using the beam portion 13 as the support portion is used in the implementation manners. However, the support portion of the present invention is not limited thereto. It is feasible as long as the support portion integrally extend between the two pump protective portions. For example, a tabular component or a rod-shaped component may also be used as the support portion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A protective construction of a fuel pump, disposed on an internal-combustion engine and protruding upwards from the internal-combustion engine carried on a vehicle, the protective construction of the fuel pump comprising:
    a protective portion, protruding upwards from the internal-combustion engine, provided between a carriage side of the vehicle and the fuel pump with a specified interval from the fuel pump, and overlapping the fuel pump in a front and rear direction,
    wherein the protective portion comprises a base portion, having two side surfaces opposite to each other, and a width between the two side surfaces increases gradually from one edge of the base portion away from the fuel pump to another edge of the base portion close to the fuel pump,
    wherein the fuel pump comprises a casing, a plunger and a flow control valve.

2. The protective construction of the fuel pump according to claim 1, wherein
    the internal-combustion engine is a multi-cylinder internal-combustion engine transversely carried on the vehicle, and
    the fuel pump and the protective portion are configured near a central position between two adjacent cylinders in a state of lining up in the front and rear direction.

3. The protective construction of the fuel pump according to claim 1, wherein
    the internal-combustion engine is a V-type internal-combustion engine that comprises two banks and is transversely carried on the vehicle,
    the fuel pump is configured, with respect to a bank at the carriage side of the two banks, in a state of offsetting by a specified distance from a center of the bank to a side of the other bank, and the protective portion is configured in a space produced due to an offset by the specified distance of the fuel pump.

4. The protective construction of the fuel pump according to claim 2, wherein
the internal-combustion engine is a V-type internal-combustion engine that comprises two banks and is transversely carried on the vehicle,
the fuel pump is configured, with respect to a bank at the carriage side of the two banks, in a state of offsetting by a specified distance from a center of the bank to a side of the other bank, and
the protective portion is configured in a space produced due to an offset by the specified distance of the fuel pump.

5. The protective construction of the fuel pump according to claim 1, wherein
the protective portion further comprises:
two pump protective portions, having a left protective arm portion and a right protective arm portion, the two pump protective portions extending diagonally and upwards from a specified location of the base portion to the side of the fuel pump, and having an interval between the left protective arm portion and the right protective arm portion, wherein the interval increases gradually towards the fuel pump; and
a support portion, integrally extending between the two pump protective portions.

6. The protective construction of the fuel pump according to claim 2, wherein
the protective portion further comprises:
two pump protective portions, having a left protective arm portion and a right protective arm portion, the two pump protective portions extending diagonally and upwards from a specified location of the base portion to the side of the fuel pump, and having an interval between the left protective arm portion and the right protective arm portion, wherein the interval increases gradually towards the fuel pump; and
a support portion, integrally extending between the two pump protective portions.

7. The protective construction of the fuel pump according to claim 3, wherein
the protective portion further comprises:
two pump protective portions, having a left protective arm portion and a right protective arm portion, the two pump protective portions extending diagonally and upwards from a specified location of the base portion to the side of the fuel pump, and having an interval between the left protective arm portion and the right protective arm portion, wherein the interval increases gradually towards the fuel pump; and
a support portion, integrally extending between the two pump protective portions.

8. The protective construction of the fuel pump according to claim 4, wherein
the protective portion further comprises:
two pump protective portions, having a left protective arm portion and a right protective arm portion, the two pump protective portions extending diagonally and upwards from a specified location of the base portion to the side of the fuel pump, and having an interval between the left protective arm portion and the right protective arm portion, wherein the interval increases gradually towards the fuel pump; and
a support portion, integrally extending between the two pump protective portions.

9. The protective construction of the fuel pump according to claim 1, wherein
the protective portion is a protective component that is independent of a main body of the internal-combustion engine and that is screw-fastened on the main body of the internal-combustion engine,
a plurality of screw holes used to screw-fasten the protective component on the main body of the internal-combustion engine are disposed on the base portion of the protective component, and
at least one of the plurality of screw holes and a support portion are configured to line up in a left and right direction of the vehicle.

10. The protective construction of the fuel pump according to claim 2, wherein
the protective portion is a protective component that is independent of a main body of the internal-combustion engine and that is screw-fastened on the main body of the internal-combustion engine,
a plurality of screw holes used to screw-fasten the protective component on the main body of the internal-combustion engine are disposed on the base portion of the protective component, and
at least one of the plurality of screw holes and a support portion are configured to line up in a left and right direction of the vehicle.

11. The protective construction of the fuel pump according to claim 3, wherein
the protective portion is a protective component that is independent of a main body of the internal-combustion engine and that is screw-fastened on the main body of the internal-combustion engine,
a plurality of screw holes used to screw-fasten the protective component on the main body of the internal-combustion engine are disposed on the base portion of the protective component, and
at least one of the plurality of screw holes and a support portion are configured to line up in a left and right direction of the vehicle.

12. The protective construction of the fuel pump according to claim 4, wherein
the protective portion is a protective component that is independent of a main body of the internal-combustion engine and that is screw-fastened on the main body of the internal-combustion engine,
a plurality of screw holes used to screw-fasten the protective component on the main body of the internal-combustion engine are disposed on the base portion of the protective component, and
at least one of the plurality of screw holes and a support portion are configured to line up in a left and right direction of the vehicle.

13. The protective construction of the fuel pump according to claim 5, wherein
the protective portion is a protective component that is independent of a main body of the internal-combustion engine and that is screw-fastened on the main body of the internal-combustion engine,
a plurality of screw holes used to screw-fasten the protective component on the main body of the internal-combustion engine are disposed on the base portion of the protective component, and
at least one of the plurality of screw holes and the support portion are configured to line up in a left and right direction of the vehicle.

14. The protective construction of the fuel pump according to claim 6, wherein the protective portion is a protective component that is independent of a main body of the internal-combustion engine and that is screw-fastened on the main body of the internal-combustion engine, a plurality of screw holes used to screw-fasten the protective component on the main body of the internal-combustion engine are disposed on the base portion of the protective component, and at least one of the plurality of screw holes and the support portion are configured to line up in a left and right direction of the vehicle.

15. The protective construction of the fuel pump according to claim 7, wherein the protective portion is a protective component that is independent of a main body of the internal-combustion engine and that is screw-fastened on the main body of the internal-combustion engine, a plurality of screw holes used to screw-fasten the protective component on the main body of the internal-combustion engine are disposed on the base portion of the protective component, and at least one of the plurality of screw holes and the support portion are configured to line up in a left and right direction of the vehicle.

16. The protective construction of the fuel pump according to claim 8, wherein the protective portion is a protective component that is independent of a main body of the internal-combustion engine and that is screw-fastened on the main body of the internal-combustion engine, a plurality of screw holes used to screw-fasten the protective component on the main body of the internal-combustion engine are disposed on the base portion of the protective component, and at least one of the plurality of screw holes and the support portion are configured to line up in a left and right direction of the vehicle.

* * * * *